United States Patent [19]

Engel

[11] 3,991,985
[45] Nov. 16, 1976

[54] APPARATUS FOR MAKING AN INSTANTANEOUS SCARFING START

[75] Inventor: Stephen August Engel, Shenorock, N.Y.

[73] Assignee: Union Carbide Corporation, New York, N.Y.

[22] Filed: Jan. 13, 1975

[21] Appl. No.: 540,457

[52] U.S. Cl. .............................................. 266/51
[51] Int. Cl.² ...................................... B23K 7/06
[58] Field of Search ................. 148/9 R, 9 C, 9.5; 219/69, 75; 266/23 R, 23 H, 23 P, 23 S, 23 T, 51–53, 48; 239/DIG. 2, 556, 601

[56] References Cited
UNITED STATES PATENTS

| | | | |
|---|---|---|---|
| 2,181,974 | 12/1939 | Kehl | 266/23 S X |
| 2,284,574 | 5/1942 | Jacobsson et al. | 266/23 S X |
| 2,309,096 | 1/1943 | Bucknam et al. | 148/9.5 |
| 2,664,368 | 12/1953 | Babcock et al. | 148/9.5 |
| 3,035,947 | 5/1962 | Milton et al. | 266/23 H X |
| 3,442,499 | 5/1969 | Röder | 266/23 K |
| 3,477,646 | 11/1969 | Lytle | 239/556 X |
| 3,658,599 | 4/1972 | Svensson | 148/9.5 |
| 3,829,072 | 8/1974 | Fieser et al. | 266/23 H |

FOREIGN PATENTS OR APPLICATIONS
476,489   2/1972   Japan

*Primary Examiner*—Roy Lake
*Assistant Examiner*—Paul A. Bell
*Attorney, Agent, or Firm*—Lawrence G. Kastriner

[57] ABSTRACT

Apparatus for making an instantaneous or flying scarfing start on a moving metal workpiece, including:
a. a wire feed mechanism for feeding and contacting a spot on the workpiece where the reaction is to begin, with the end of the wire,
b. a mechanism for preheating the end of the wire to its oxygen ignition temperature,
c. a blowpipe for discharging a high intensity jet of oxygen at a point on the workpiece behind said spot, and
d. a scarfing oxygen nozzle, directed at the workpiece at an acute angle so that the scarfing oxygen stream strikes the surface slightly behind the point.

12 Claims, 11 Drawing Figures

APPARATUS FOR MAKING AN INSTANTANEOUS SCARFING START

BACKGROUND

This invention relates, in general, to thermochemical removal of metal from the surface of a workpiece, commonly called scarfing. More particularly, it relates to the making of instantaneous or "flying starts" for scarfing operations. A flying start, as that term is used throughout the present specification and claims, means the virtually instantaneous starting of a thermochemical reaction on a workpiece which is moving relative to the scarfing machine at its normal scarfing speed, i.e. a speed of from about 6 to 45 meters per minute. The lower end of said range being used for scarfing cold workpieces and the upper end for scarfing hot workpieces.

It is well known in the art that a scarfing reaction is started by preheating the metal workpiece to its molten or ignition temperature — normally by preheating flames directed on to a relatively small area — before applying an obliquely directed stream of high velocity scarfing oxygen at the molten puddle. The scarfing oxygen stream has a two-fold purpose, first to effect a thermochemical reaction with the metal, and second to blow away the reacted metal, thereby exposing fresh metal for the scarfing reaction.

Metal rods have long been used to obtain faster starts in hand scarfing operations, as shown for example by U.S. Pat. No. 2,205,890. Here the work must be stationary, and the operator, by his individual skill, must be able to manipulate both the timing of the scarfing oxygen stream, as well as the angle of the torch and rod. Starting of mechanized scarfing reactions with wire rods is likewise known, as shown by Bucknam et al. in U.S. Pat. No. 2,309,096. Scarfing starts described therein are, however, likewise possible only on stationary workpieces.

Although flying starts are known in the art, making them has only been feasible with complicated, expensive and unreliable equipment. As a result, they have met with very little commercial success. Flying starts made with the aid of metal powder are disclosed by DeVries et al. in U.S. Pat. No. 3,216,876, and those made by use of an energized electrode are disclosed by Lobosco in U.S. Pat. No. 2,513,425 and by Svensson et al. in U.S. Pat. No. 3,658,599. Rapid wear of the powder conveying equipment cause powder starts to be unreliable, and this fact plus the cost of the metal powder render powder starts unsatisfactory. The undesirable characteristics of electrically powered starting apparatus are their expense and relative complexity.

It has not been possible, prior to the present invention, to make a truly instantaneous or flying start on a moving workpiece without the use of metal powder or an electrically energized metal rod or ceramic electrode.

OBJECTS

It is an object of this invention to provide simple and reliable apparatus which is capable of making an instantaneous or flying start on a workpiece without the use of metal powder or electric power to initiate the scarfing reaction.

It is another object of this invention to provide apparatus capable of making an instantaneous, individual, fin-free, spot scarfing cut on a metal workpiece without the use of metal powder or electric power to initiate the scarfing reaction.

It is still another object of this invention to provide apparatus capable of making — in a single pass over the surface of the workpiece — a plurality of instantaneously started, randomly located, selective scarfing cuts on the workpiece which is moving at normal scarfing speed.

It is yet another object of this invention to provide apparatus capable of making an instantaneously started, conventional, full width scarfing cut on the surface of a workpiece moving at normal scarfing speed.

SUMMARY OF THE INVENTION

These and other objects which will become apparent to those skilled in the art are achieved by the present invention which consists of apparatus for making an instantaneous thermochemical start on the surface of a ferrous metal workpiece, comprising in combination:

a. means for producing relative motion between said apparatus and said workpiece, b. means for feeding wire and for contacting a preselected spot on said surface with the end of said wire, c. means for heating the end of said wire to its oxygen ignition temperature, d. blowpipe means, for discharging a high intensity jet of oxygen gas, directed (1) such that the central axis thereof strikes a point on said surface located about 1–15 cm. behind said spot relative to the direction of travel, (2) such that the included angle formed by said axis and said surface is between 30° and 80°, and (3) from a position behind or on the side of said point, and e. nozzle means for providing a stream of scarfing oxygen gas, directed at said surface at an acute angle to said surface such that the oxygen stream discharged from said nozzle strikes the surface slightly behind said point relative to the direction of travel.

The term "instantaneous" as used with reference to making a thermochemical start, in the present specification and claims, is meant to include flying starts, as well as starts where there is no relative motion between the workpiece and the scarfing apparatus until the instant contact is made between the hot wire and the preselected point of contact. At the instant of contact, however, normal scarfing speed is immediately commenced (without waiting for puddle formation as in the prior art) so that the starting process is carried out with relative motion between the workpiece and the scarfing apparatus. If motion is not immediately commenced on contact of the hot wire, the oxygen jet would gouge a hole in the workpiece within a very short time. The relative motion may, of course, be caused by moving either the work surface relative to stationary scarfing apparatus or vice versa.

After the molten puddle has been spread to its preselected width, the instantaneous start has been completed. The spreading oxygen stream may then be left on and used to carry out the scarfing reaction, or it may be turned off and another oxygen stream may be impinged on the spread puddle at an acute angle to the work surface in order to "take over" and carrying out the scarfing reaction. The type of scarfing cut sought will determine the type of scarfing oxygen nozzle used to take over the scarfing reaction from the spreading nozzle stream.

An individual, fin-free, spot scarfing cut can be made by discharging at the puddle, an oblique, sheet-like stream of scarfing oxygen gas whose intensity of flow is gradually diminished towards the edges of the stream, reaching zero intensity at the lateral edges of the nozzle orifice from which it is discharged. Such a nozzle produces a cut which is narrower than the width of said nozzle orifice. Such a scarfing cut can be made with the nozzles described and claimed in my copending U.S. patent application Ser. No. 607,888 filed Aug. 26, 1975, the entire disclosure of which is incorporated herein by reference.

If selective spot scarfing of randomly located defects over the entire surface of a workpiece is sought to be done in a single pass, the scarfing cuts must be made not only fin-free, but also in such manner that adjacent cuts will neither overlap nor leave excessively high ridges or deep grooves between them. This requires nozzles capable of discharging at the puddle, abutting side-by-side scarfing oxygen streams, each of whose intensity of flow diminishes gradually towards its edges and each of which produces a scarfing cut which is at least as wide as its discharge orifice. Nozzles for making such scarfing cuts are described and claimed in my copending U.S. patent application Ser. No. 607,887 filed Aug. 26, 1975, the entire disclosure of which is incorporated herein by reference. As these scarfing units pass over the workpiece at normal scarfing speed, they can be turned on and off in a preselected manner, to scarf out any random pattern of defects located on the surface of the workpiece.

If a conventional scarfing pass is sought to be made, this can be done by directing an oblique sheet-like stream of scarfing oxygen at the puddle from a conventional, rectangularly shaped scarfing nozzle whose intensity of flow is substantially uniform across its entire width. In such case, the instantaneous scarfing start provides the improvement of being able to start the scarfing reaction on a workpiece as it comes into register with the scarfing units, without having to slow down or stop either the workpiece or the units in order to start the scarfing reaction — as is required when using conventional preheating flames. The instantaneous start permits the scarfing operation to begin immediately upon contact of the apparatus with the workpiece.

DETAILED DESCRIPTION

Figure 1:
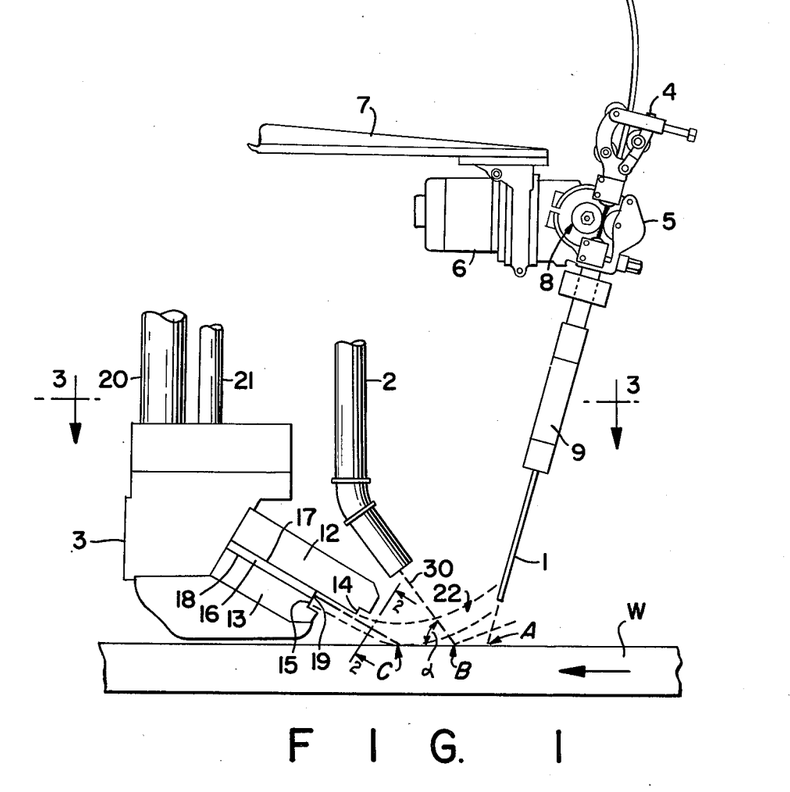
FIG. 1 is a side view illustrating the apparatus used for making an individual, fin-free spot scarfing cut with an instantaneous start, in accordance with a preferred embodiment of the present invention.

In FIG. 1 the starting wire 1, which may be coiled on a spool (not shown), passes through a wire straightener 4, a wire feeder 5, and a wire guide 9, making contact on the surface of the workpiece W at the point A, the point where the spot scarfing reaction, just ahead of the defective spot, is to begin. Wire feeder 5 is fixedly attached to feeder drive motor 6, which in turn is mounted on mounting bracket 7. Wire 1 may be driven by drive wheel 8 in either the forward or reverse direction. Upon actuation of motor 6, approximately 2 inches of the wire are driven forward to contact the work surface at point A. Oxygen spreader blowpipe 2 may be a plain 1-5 cm round bore nozzle. It will produce puddles having widths of from about 5 cm to 35 cm respectively. Blowpipe 2 is inclined at its discharge end at an angle to the work surface, such that its projected centerline as well as that of oxygen jet 30 will strike the work surface at point B, approximately 5 cm behind point A relative to the direction of travel. Scarfing unit 3 is comprised of conventional upper and lower preheat blocks 12 and 13, respectively, which may be provided with a row of either premixed or post-mixed preheat flame ports 14 and 15 respectively, and suitable gas passages therein. If post-mixed preheat flames are used, these being preferred for greatest safety, ports 14 and 15 will be used for discharging a fuel gas which will burn upon ignition by admixture with a low velocity flow of oxygen emanating from the scarfing oxygen nozzle slot 16 formed by the lower surface 17 of upper preheat block 12 and the upper surface 18 of the lower preheat block 13. The slot oxygen nozzle 16 terminates within discharge orifice 19.

Figure 2:
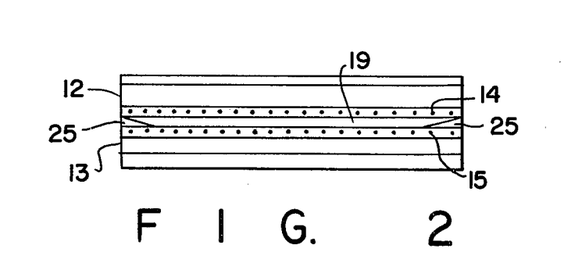
FIG. 2 is a front face view of the scarfing oxygen nozzle orifice taken along line 2—2 of FIG. 1.

In order to produce an individual, fin-free spot scarfing cut, orifice 19 is shaped as shown in FIG. 2. Oxygen and fuel gas are supplied to the scarfing unit 3 through feed pipes 20 and 21, respectively by means well known in the art.

The apparatus shown in FIG. 1 functions as follows. First, the preheat flames emanating from scarfing unit 3 are ignited by actuating the flow of fuel gas from the rows of preheat ports 14 and 15, and a low flow of oxygen gas through orifice 19. These preheat flames, indicated by lines 22, strike the work surface and are deflected upward, so that they impinge upon and heat up the end of wire 1 to a bright red color, indicative that the wire tip is at its oxygen ignition temperature, i.e. its ignition temperature in an oxygen atmosphere. when the defective area to be scarfed out of the moving workpiece W reaches a point just ahead of point A, the wire feed motor 6 is actuated, causing the hot end of wire 1 to be driven down into firm contact with the work surface at point A. Simultaneously, a high pressure jet of oxygen is discharged from blowpipe 2, aimed at point B so as to impinge on the hot wire in contact with the surface of the moving workpiece, thereby causing an instantaneous scarfing reaction to begin and a molten puddle to form on the defective spot. Wire 1 is then retracted to prevent its further melting. The oxygen jet from blowpipe 2 causes the puddle to grow to its full width very rapidly, at which time it is shut off and the scarfing oxygen stream from orifice 19 which is aimed at point C on the work surface is increased to its scarfing flow rate, to take over the reaction from the spreader jet. The scarfing oxygen flow is kept on for as long as the scarfing cut is desired.

The steps following ignition of the preheat flames discharged from scarfing unit 3 may be automated to operate through a series of sequenced timers, relays and solenoid valves, so that an operator, or other appropriate signal, will initiate and automatically carry out the sequence of steps described above. A second signal is required to end the cut by shutting off or decreasing the scarfing oxygen flow to an amount just sufficient to maintain the preheat flames on. In this state the apparatus is ready to immediately spot scarf again.

An alternative way of operating the apparatus is to turn the scarfing oxygen stream on at the same time as the spreader oxygen jet. The latter stream, having much more impact will control the course of the thermochemical reaction, i.e. it will cause the puddle to form and spread. Then, as the spreader jet is shut off, the scarfing oxygen flow will take over the reaction in a very gradual and even, though rapid, manner.

FIG. 2 shows the scarfing nozzle orifice 19 used in the scarfing unit of FIG. 1 for producing an individual, fin-free scarfing cut. Other types of scarfing nozzles useful in the present invention are described in detail in my above-mentioned copending application Ser. No. 607,888 filed Aug. 26, 1975. It is important to note that a critical parameter of such a nozzle is that the cut it produces is narrower than the width of the nozzle itself. This is necessary in order to obtain an individual, fin-free spot scarfing cut. This fact, however, prevents such nozzles from being used side-by-side with another such nozzle, because the parallel cuts which they produce would leave an unscared surface between the cuts. Hence, such nozzles are useful only for making individual, fin-free cuts. FIG. 2 which is a view of FIG. 1 along line 2–2 shows the upper and lower preheat blocks 12 and 13, containing the rows of upper and lower preheat fuel gas ports 14 and 15 respectively. The oxygen nozzle orifice 19, thereby causing the edges of the oxygen stream emanating from the orifice 19 to be gradually less intense, i.e. to have less impact on the work surface.

It is to be noted that while the distance in FIG. 1 between points A and B is about 5 cm, this distance may vary from about 1 cm to 15 cm, preferably it is kept between 5 and 10 cm. The optimum distance between points A and B depends upon the angle $\alpha$ at which the oxygen jet is directed at the work surface; the greater the angle, the smaller the distance between the points. The angle $\alpha$ may vary from about 30° to 80°; the preferred angle is between 50° and 60°. If the angle $\alpha$ of the jet is 30°, the distance should be the maximum, about 15 cm, while if it is 80°, the minimum 1 cm distance should be used. However, the points A and B must not lie on top of each other, that is, the projection 30 should not intersect the projection of wire 1 to meet on the surface of the workpiece, since this will prevent the instantaneous start from taking place. Point C should be slightly behind point B, i.e. more specifically, about 0 to 15 cm beind point B.

FIGS. 3–6 are sketches illustrating how instantaneous of flying starts, made by uses of the present invention, take place. It is important to bear in mind that the sequence of steps illustrated in FIGS. 3–6 represent the reactions which take place in about 1½ seconds.

Figure 3:
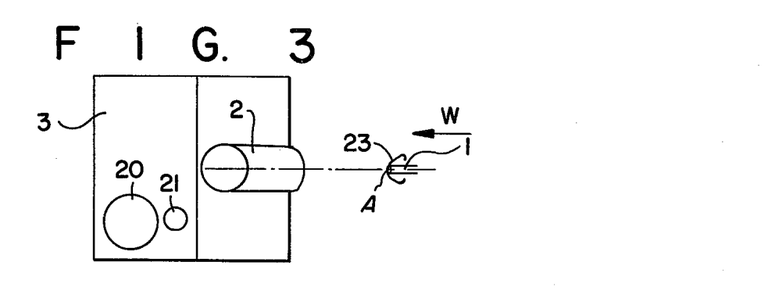
FIGS. 3, 4, 5 and 6 are schematic illustrations of the sequence of reactions, viewed from above along line 3—3 of FIG. 1, which takes place on the workpiece as an instantaneous start is made using the apparatus such as shown in FIG. 1.

FIG. 3 shows the time when the hot end of wire 1 has made contact with point A, just ahead of the defect spot on the moving work surface. The arrow indicates the direction in which the workpiece W is traveling at a speed of about 15 meters/min. Simultaneously, oxygen from spreader blowpiece 2 causes ignition of the hot end of the wire in contact with the surface of the workpiece. This in turn melts the area 23 surrounding point A. The instantaneous start has begun.

Figure 4:
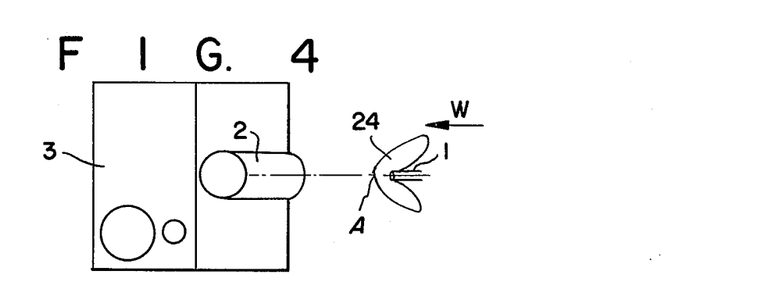

FIG. 4 shows the same area about one-half second later than FIG. 3. As the steel workpiece continues to move in the direction of the arrow, the molten puddle 24 begins to be spread by the action of the oxygen spreader jet 2 in a fan-like shape.

Figure 5:
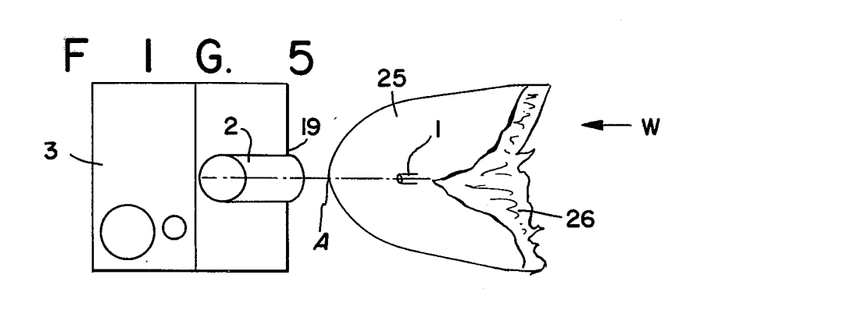

FIG. 5 represents the defective area approximately 1 second later than FIG. 3. Area 25 shows the molten puddle which has been spread on the moving workpiece W by the continuous discharge of oxygen from the spreader blowpipe 2. The starting wire 1 has now been retracted. With the puddle having been spread to its maximum width of about 25 cm, the oxygen from blowpipe 2 is now shut off, and the scarfing oxygen flow rate from scarfing unit 3 is increased to take over the scarfing reaction. The scarfing oxygen stream having picked up the puddle, continues the scarfing cut in the area 26. Area 26 contains both molten metal and slag on top of unscarfed steel and is clearly distinguishable from the all molten puddle area 25.

Figure 6:
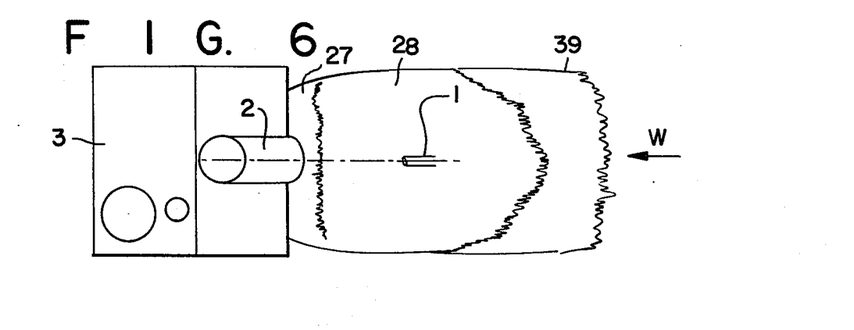

The manner in which the reaction proceeds can be seen from FIG. 6, which represents the reaction about 1½ seconds later than FIG. 3. Area 27 has been scarfed, area 28 is molten but scarfing has not yet taken place, and area 39 contains a mixture of slag and molten metal on top of unscarfed steel. As the surface of the metal moves by under the scarfing apparatus, it goes through three clearly distinguishable stages, the first being an area of molten metal and slag on top of unscarfed steel, the second molten metal alone, and third scarfed. At the time shown in FIG. 6, the starting wire remains retracted, the spreader oxygen flow shut off, and a full width scarfing cut is being made by the scarfing unit 3. It is important to note that the width of the cut from scarfing nozzle is the same as the width to which the spreader blowpipe 2 has spread the puddle. This is important in order to prevent fin formation.

Figure 7:
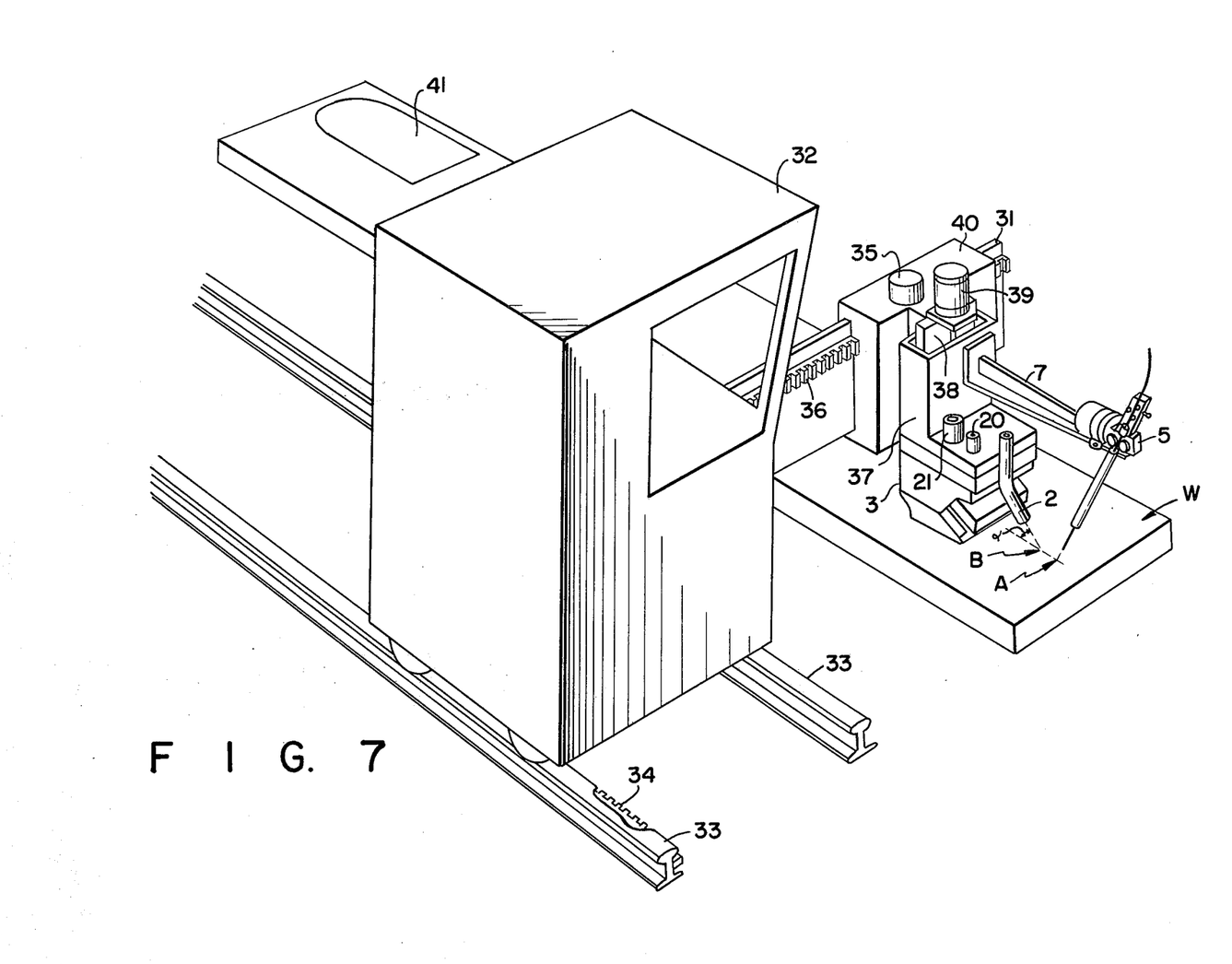
FIG. 7 shows in perspective, apparatus in accordance with the present invention, cantilever mounted for remote control.

FIG. 7 shows a perspective view of the apparatus of FIG. 1, cantilever mounted for purposes of making the scarfing apparatus movable both laterally across the width of the workpiece W, as well as longitudinally along its length. Horizontal frame member 31 is fixedly attached to a rail mounted operator's pulpit 32. Puplip 32 contains the controls for operation of the apparatus, including the starting wire feed mechanism 5, the oxygen discharged from the spreader blowpipe 2, as well as the oxygen and fuel gases which are supplied to scarfing unit 3 through feed pipes 20 and 21, respectively. Pulpit 32 is mobile laterally along the workpiece W on rails 33. A rack 34, fixedly attached to one of the rails, is engaged by a motor driven pinion (not shown) mounted under pulpit 32, permitting the entire cantilever mounted scarfing assembly and pulpit to be controllably moved along tracks 33. The scarfing assembly consisting of the scarfing unit 3, blowpipe 2, and wire feed mechanism 5 are all fixedly attached to carriage member 37 which rides up and down on plate 38 which in turn is fixedly attached to housing 40. Motor 39 is used to controllably raise and lower the scarfing assembly by a rack and pinion arrangement (not shown) with the rack fixedly attached to plate 38. The scarfing assembly and housing 40 is also capable of being mechanically moved across the width of the workpiece W, by motor driven pinion 35 which engages rack 36, fixedly attached to frame 31. The apparatus shown in FIG. 7 may be used to selectively spot scarf randomly located defects on the surface of the workpiece by being moved in line with the defect and then traveling longitudinally over the defective area. Area 41 illustrates a typical spot scarfing cut made by the apparatus shown.

Figure 8:
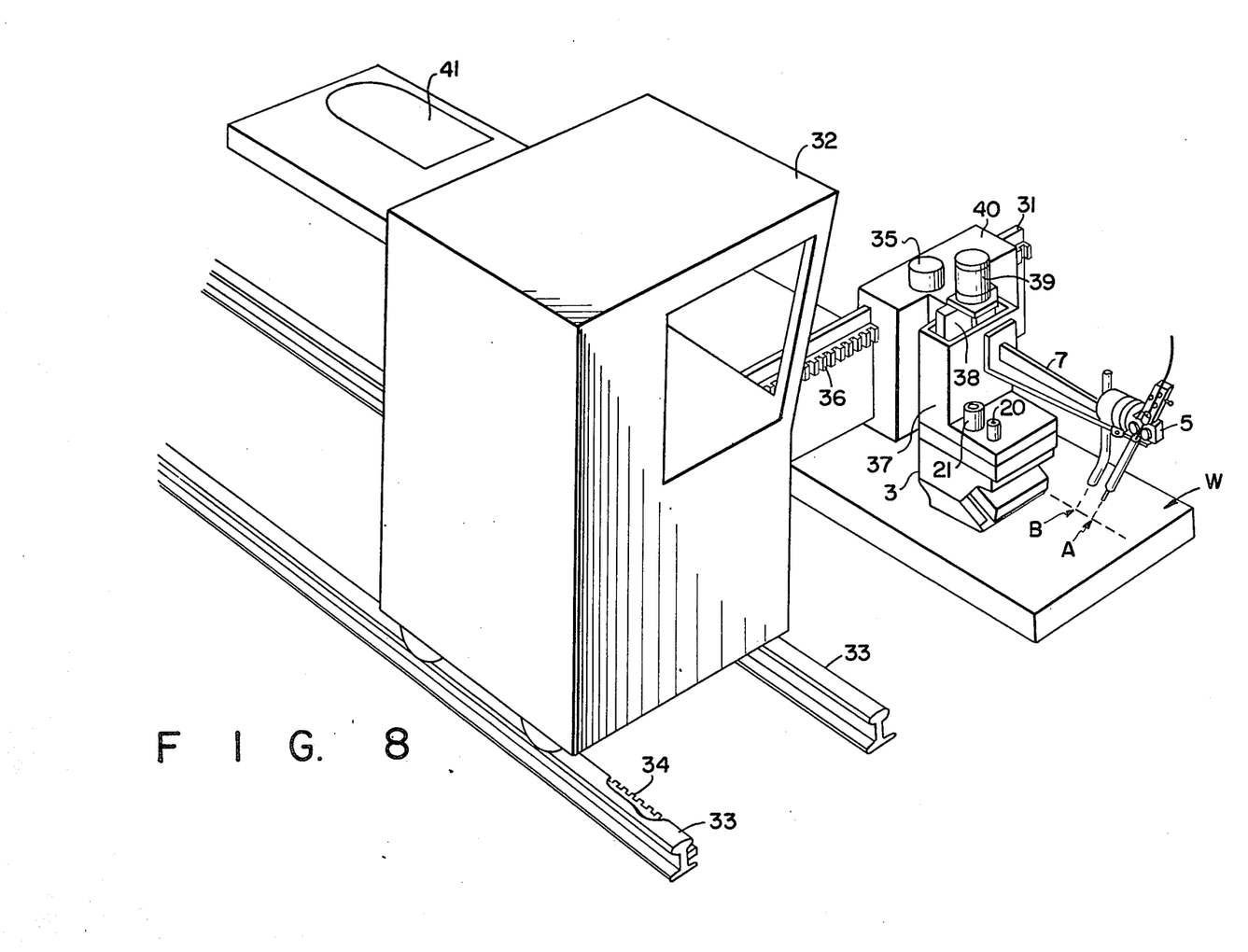
FIG. 8 shows a modified version of the apparatus shown in FIG. 7.

FIG. 8 illustrates an alternative positioning of blowpipe 2, compared to that shown in FIG. 7. In the arrangement shown in FIG. 8, blowpipe 2 is directed at point B from the right side of the workpiece W, causing the puddle to be projected toward the left side of the workpiece in front of the scarfing unit 3. This arrangement permits one to spread the starting puddle more rapidly over a wider area, enabling a wider scarfing cut to be made, than with the same sized blowpipe arranged as shown in FIG. 7. Blowpipe 2 can, of course, also be located on the left side or anywhere in between. That is, it can be directed from a position behind point B, on either side of point B or from any position therebetween, but not from in front of point B because that would spread the puddle rearwards which would prevent the instantaneous start from taking place. A combination using two such blowpipes could also be used; the arrangement of FIG. 7 to start and the arrangement of FIG. 8 to spread the puddle.

Figure 9:
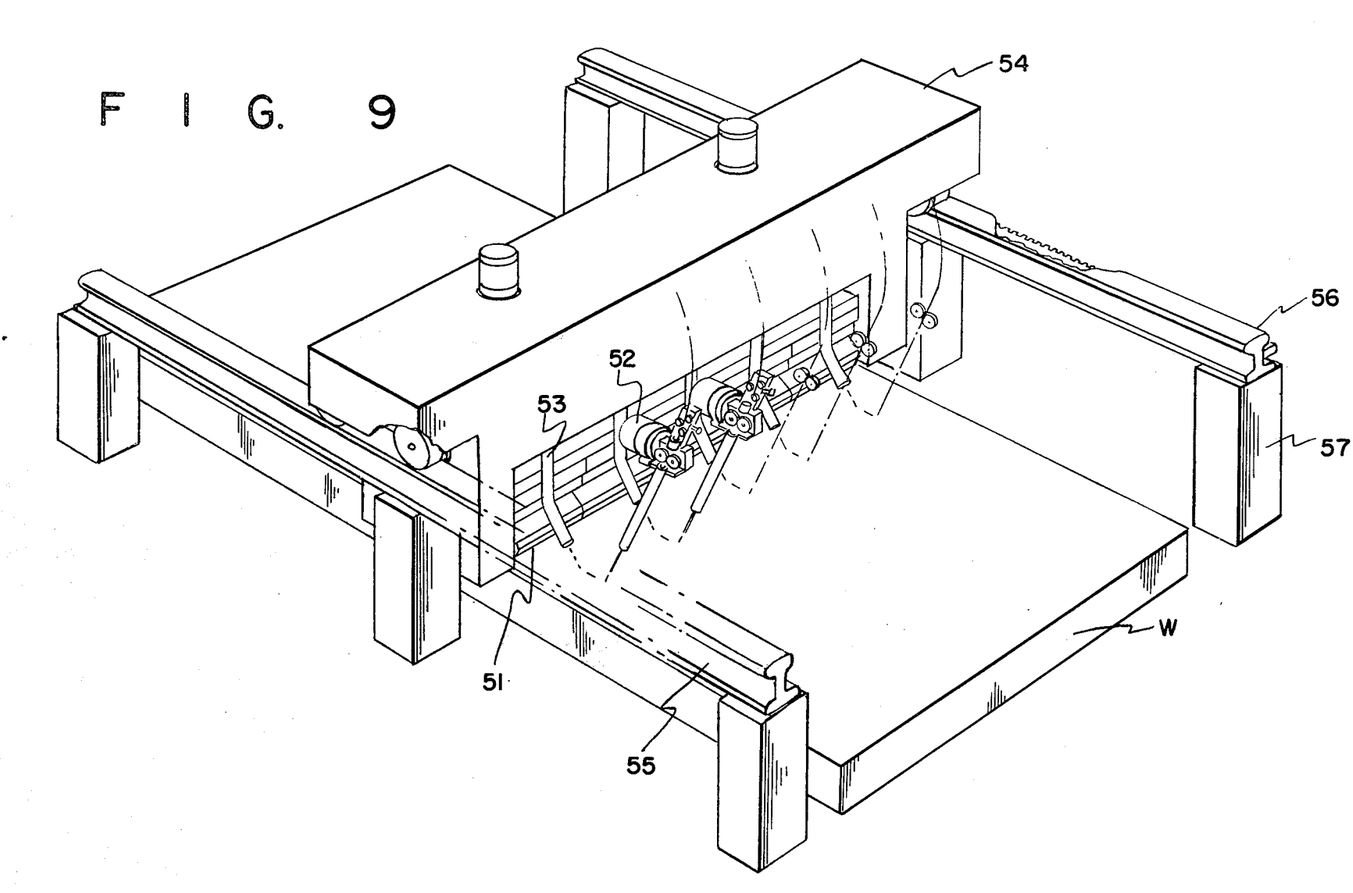
FIG. 9 illustrates in perspective view, another preferred embodiment of the present invention, namely, a plurality of adjacent scarfing units for performing instantaneously started, selected, randomly located, spot scarfing cuts over the entire surface of the workpiece in a single pass.

FIG. 9 illustrates, in perspective, a plurality of scarfing units provided with nozzles for performing selective, spot scarfing of randomly located defects with instantaneous or flying starts over the entire surface of a workpiece W in a single pass. The plurality of scarfing units 51, corresponding wire feed apparatus 52 (only two are shown for purposes of clarity) and spreader blowpipes 53 are all fixedly mounted upon a mobile carriage 54 which rides upon gantry rails 55 and 56, respectively by rack and pinion motive means. Rails 55 and 56 are fixedly mounted upon gantry support members 57. The entire assembly of adjacent flying start scarfing units is able to pass over the full length of the workpiece W, whereby the entire width can be selectively scarfed at normal scarfing speed by the selective operation of each of the scarfing assemblies separately. Although in the apparatus illustrated in FIG. 9 the workpiece is stationary and the scarfing apparatus moves over it, it is possible — and in some cases preferable — to do the reverse; namely, to have a stationary scarfing apparatus under which the workpieces pass on rollers driven at normal scarfing speed.

When performing selective spot scarfing with apparatus such as disclosed in FIG. 9, wherein two or more cuts of overlapping duration may be made, which cuts may be started at different times, but in which the speed of both are determined by the relative motion between the workpiece and the scarfing assembly, no pause or slow-down in scarfing speed can be tolerated, from the instant a first cut is begun until the last has been completed. The reason for this is that a pause would uncontrollably affect a cut in progress by an adjacent unit. In other words, if the assembly has to be slowed down, for example, for preheating purposes as in the prior art, an adjoining assembly in which the scarfing oxygen is on, would gouge a deep hole in the workpiece. Hence, it should be apparent why no slow down may be tolerated in a multi-cut, selective, spot scarfing operation, and why the instantaneous or flying start is of such crucial importance to the proper functioning of such apparatus.

In addition, it is essential that use of the apparatus not cause scarfing cuts which either overlap the area to be scarfed by an adjacent unit, or cause fins or ridges between adjacent scarfing cuts. This requirement is satisfied by providing the "gang pass" scarfing oxygen nozzles, i.e. a plurality of adjacent scarfing units with nozzles such as shown in FIG. 10.

Figure 10:
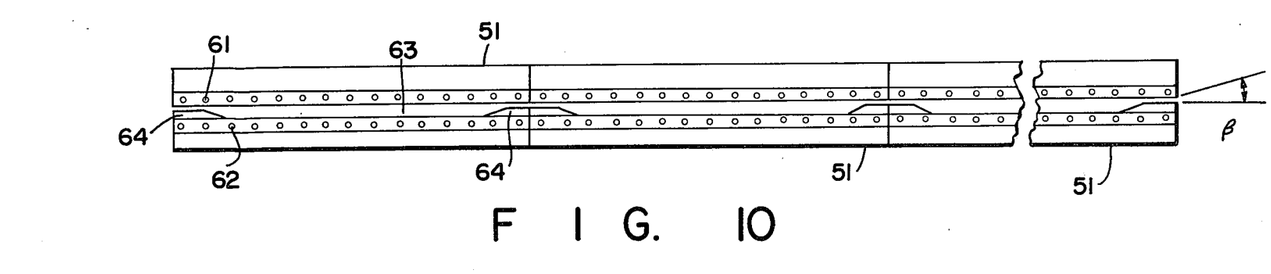
FIG. 10 is a view of a front face of the scarfing oxygen nozzle orifices used in the scarfing units shown in FIG. 9.

FIG. 10 illustrates the front face of the scarfing units employed in the gang pass scarfing nozzles of FIG. 9. These nozzles each contain a row of upper and lower post-mixed fuel gas ports 61 and 62, respectively above and below the scarfing oxygen discharge orifice 63. Orifice 63 is typically about 0.6 cm high and 20 cm wide. Its edges are partially closed by the end wall members 64. These are typically about 3 cm along the bottom edge, 0.4 cm high (at its maximum height) and contain an inclined cut having an internal angle of about 10°. Such end wall members 64 are provided at each end of each scarfing oxygen orifice 63 in order to gradually diminish the flow of oxygen towards the edges of each unit, but without totally closing off the edge of the unit, as is done in the case of the orifice shown in FIG. 2. While orifices of the type shown in FIG. 2 create a scarfing cut on the workpiece which is narrower than the width of the orifice from which the oxygen is discharged, the gang pass orifice 63 of FIG. 10 produces a cut which though flared toward its outer edges, is of the same width as the orifice 63 itself. Therefore, it creates a cut which just meets the adjacent cut, without overlapping it, without causing excessively high ridges and without causing fins to be formed on the metal surface.

Figure 11:
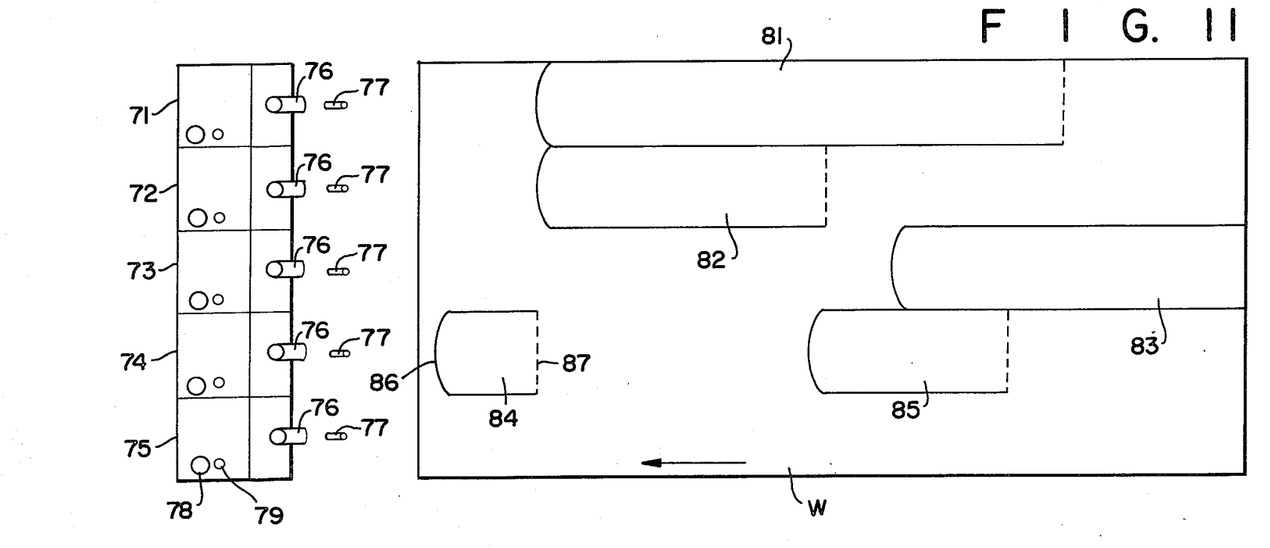
FIG. 11 is a top view of FIG. 9 illustrating the manner in which the invention functions to produce a plurality of instantaneously started spot scarfing cuts in a single pass over the entire surface of the workpiece.

FIG. 11 is a top view illustrating the manner in which the apparatus shown in FIG. 10 functions to produce selective, multi-cut, spot scarfing of randomly located defects on the surface of a workpiece made with flying starts. Reference to FIG. 11 will show a plurality of adjacent scarfing units 71, 72, 73, 74 and 75, each of which contains an oxygen spreader blowpipe 76, a hot starting wire 77, and each of which is provided with oxygen and fuel gas to the scarfing unit through passages designated 78 and 79, respectively.

The areas containing randomly located defects on the surface of workpiece W to be spot scarfed out are designated 81, 82, 83, 84 and 85. As the moving gang of adjacent scarfing units comes into contact with the workpiece W, a flying start be made by unit 74 as it reaches the front end 86 or area 84 and must remain in operation until it reaches the back end 87 of area 84, at which time unit 74 is shut off, and units 71 and 72 are started on the fly. As the gang of scarfing units passes over the workpiece, unit 72 will remain on until it reaches the back end of defective area 82 at which time it will be shut off, either by an operator or a mechanical or electrical signal, while unit 71 remains on. Unit 74 would be turned on again to begin spot scarfing the area designated 85. As the beginning or area 83 is approaches by the gang of scarfing units, unit 73 is turned on, unit 74 is turned off as the end of area 85 is reached, and unit 71 is turned off as the end of area 81 is reached. Unit 73 is turned off when the end of area 83 is reached. During the entire spot scarfing pass, unit 74 remained off, since no defects were contained in the zone of the workpiece over which this particular unit passed.

While not illustrated by any of the drawings, a conventional scarfing cut would be made in the same manner as the spot scarfing cuts described above, except that one or more conventional, rectangular orificed scarfing nozzles would be used in place of the spot scarfing nozzles, and the work surface would be uniformly desurfaced.

What is claimed is:

1. Apparatus for making an instantaneous thermochemical start on the surface of a ferrous metal workpiece comprising in combination:
    a. means for producing relative motion between said apparatus and said workpiece,
    b. means for feeding wire and for contacting a preselected spot on said surface with the end of said wire,
    c. means for heating the end of said wire to its oxygen ignition temperature,
    d. blowpipe means, for discharging a high intensity jet of oxygen gas, directed (1) such that the central axis thereof strikes a point on said surface located about 1–15 cm. behind said spot relative to the direction of travel, (2) such that the included angle formed by said axis and said surface is between 30° and 80°, and (3) from a position behind or on the side of said point, and
    e. nozzle means for providing a stream of scarfing oxygen gas, directed at said surface at an acute angle to said surface such that the oxygen stream discharged from said nozzle strikes the surface slightly behind said point relative to the direction of travel.

2. The apparatus of claim 1 wherein said blowpipe means is directed from a position directly behind said point.

3. The apparatus of claim 1 wherein said blowpipe means is directed from a position on the side of said point.

4. The apparatus of claim 1 wherein the means for heating the end of said wire are flame means.

5. The apparatus of claim 1 wherein said blowpipe means is directed such that said point is located about 5–10 cm. behind said spot and said included angle is between 50° and 60°.

6. The apparatus of claim 1 wherein said nozzle means is characterized by having a discharge orifice whose height is gradually reduced to zero at its lateral edges.

7. The apparatus of claim 1 wherein said nozzle means is characterized by having a discharge orifice whose height is gradually reduced at its edges, but remains greater than zero at its lateral edges.

8. The apparatus of claim 1 wherein said nozzle means is characterized by having a discharge orifice whose height is uniform across the entire width of said orifice.

9. The apparatus of claim 1, wherein said means for feeding wire, said means for heating the end of said wire, said blowpipe means, and said nozzle means are cantilever mounted for remote control operation.

10. The apparatus of claim 6, wherein said means for feeding wire, said means for heating the end of said wire, and blowpipe means, and said nozzle means are cantilever mounted for remote control operation.

11. The apparatus of claim 1, wherein said means for feeding wire, said means for heating the end of said wire, said blowpipe means, and said nozzle means are gantry mounted for remote control operation.

12. The apparatus of claim 7, wherein said means for feeding wire, said means for heating the end of said wire, said blowpipe means, and said nozzle means are gantry mounted for remote control operation.

* * * * *

UNITED STATES PATENT OFFICE
CERTIFICATE OF CORRECTION

Patent No. 3,991,985         Issue Date   November 16, 1976

Inventor(s)   Stephen August Engel

It is certified that error appears in the above-identified patent and that said Letters Patent are hereby corrected as shown below:

In col. 1, line 10,  "flying start " should be enclosed by quotation marks
In col. 2, line 41,  "flying starts" should be enclosed by quotation marks
In col. 2, line 65,  "take over" should be enclosed by quotation marks
In col. 4, line 34,  "." after "safety" should read --,--
In col. 5, line 24,  "take over" should be enclosed by quotation marks
In col. 6, line 8,   "blowpiece" should read --blowpipe--
In col. 6, line 25,  "take over" should be enclosed by quotation marks
In col. 6, line 53,  "puplip" should read --pulpit--
In col. 8, line 13,  "gang pass" should be enclosed by quotation marks
In col. 8, line 52,  after "a flying start" insert "must"
In col. 8, line 53,  "or" should read --of--
In col. 8, line 62,  "or" should read --of--
In col. 10, line 28, "and", first occurrence, should read --said--

Signed and Sealed this

Twenty-ninth Day of March 1977

[SEAL]

Attest:

RUTH C. MASON
Attesting Officer

C. MARSHALL DANN
Commissioner of Patents and Trademarks